United States Patent
Jagota et al.

(10) Patent No.: US 10,354,264 B2
(45) Date of Patent: Jul. 16, 2019

(54) CONTACT RECOMMENDATIONS BASED ON PURCHASE HISTORY

(71) Applicant: salesforce.com, inc., San Francisco, CA (US)

(72) Inventors: Arun Jagota, Sunnyvale, CA (US); Gregory Haardt, San Carlos, CA (US); Govardana Sachithanandam Ramachandran, San Jose, CA (US); Lei Ming, Fremont, CA (US); Matthew Fuchs, Los Gatos, CA (US); George Vitchev, Santa Clara, CA (US); Fang Wong, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 592 days.

(21) Appl. No.: 14/486,111

(22) Filed: Sep. 15, 2014

(65) Prior Publication Data

US 2015/0269595 A1    Sep. 24, 2015

Related U.S. Application Data

(60) Provisional application No. 61/969,447, filed on Mar. 24, 2014.

(51) Int. Cl.
*G06Q 30/00* (2012.01)
*G06Q 30/02* (2012.01)
(Continued)

(52) U.S. Cl.
CPC ....... *G06Q 30/0202* (2013.01); *G06Q 10/067* (2013.01); *G06Q 10/06315* (2013.01);
(Continued)

(58) Field of Classification Search
CPC .......... G06Q 30/0255; G06Q 30/0235; G06Q 10/105; G06Q 10/103; G06Q 10/067;
(Continued)

(56) References Cited

U.S. PATENT DOCUMENTS 5,577,188 A   11/1996   Zhu
5,608,872 A   3/1997   Schwartz
(Continued)

OTHER PUBLICATIONS

Chiu et al., Web Interface-Driven Cooperative Exception Handling in ADOME Workflow Management System, Information Systems vol. 26, No. 2, pp. 93-120. (Year: 2001).*
(Continued)

*Primary Examiner* — Mehmet Yesildag
*Assistant Examiner* — Uche Byrd
(74) *Attorney, Agent, or Firm* — Dergosits & Noah LLP; Todd A. Noah

(57) ABSTRACT

Contact recommendations based on purchase history are described. A system creates a directed graph of nodes in which at least some of the nodes are connected by directed arcs, wherein a directed arc from a first node to a second node represents a conditional probability that previous users who purchased a first contact also purchased a second contact. The system identifies a set of contacts purchased by a current user. The system estimates a prospective purchase probability based on a historical probability that previous users purchased a specific contact and a related probability that previous users who purchased the specific contact also purchased a contact in the set of contacts, for each candidate contact. The system outputs a recommendation for the current user to purchase a recommended candidate contact based on a corresponding prospective purchase probability.

16 Claims, 4 Drawing Sheets

(51) Int. Cl.
*G06Q 10/06* (2012.01)
*G06Q 40/00* (2012.01)
*G06Q 10/10* (2012.01)
*G06Q 30/06* (2012.01)

(52) U.S. Cl.
CPC ......... *G06Q 10/103* (2013.01); *G06Q 10/105* (2013.01); *G06Q 30/00* (2013.01); *G06Q 30/02* (2013.01); *G06Q 30/0235* (2013.01); *G06Q 30/0255* (2013.01); *G06Q 30/06* (2013.01); *G06Q 30/0631* (2013.01); *G06Q 40/00* (2013.01)

(58) Field of Classification Search
CPC .. G06Q 30/02; G06Q 10/06315; G06Q 40/00; G06Q 30/00; G06Q 30/06; H04Q 7/20
See application file for complete search history.

(56) References Cited

U.S. PATENT DOCUMENTS

| | | | |
|---|---|---|---|
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,085,169 A * | 7/2000 | Walker | G06Q 10/02 705/4 |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,519,642 B1 * | 2/2003 | Olsen | G06F 15/16 709/205 |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,113,917 B2 * | 9/2006 | Jacobi | G06Q 30/02 705/14.53 |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,676,400 B1 * | 3/2010 | Dillon | G06Q 30/02 705/26.7 |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 7,881,984 B2 * | 2/2011 | Kane, Jr. | G06F 17/30867 705/26.7 |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 8,799,096 B1 * | 8/2014 | Dillon | G06Q 30/02 705/26.1 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0233273 A1 * | 12/2003 | Jin | G06Q 10/06 706/45 |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |

(56) References Cited

U.S. PATENT DOCUMENTS

| | | |
|---|---|---|
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Rueben et al. |
| 2009/0177744 A1 | 7/2009 | Marlow et al. |
| 2012/0078747 A1 | 3/2012 | Chakrabarti et al. |
| 2012/0233137 A1 | 9/2012 | Jakobson et al. |
| 2013/0066676 A1* | 3/2013 | Williams ............... G06Q 30/00 705/7.29 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0317038 A1 | 10/2014 | Mojsilovic et al. |
| 2015/0088685 A1 | 3/2015 | Tishkevich |

OTHER PUBLICATIONS

U.S. Appl. No. 13/998,890.
U.S. Appl. No. 13/987,075.
U.S. Appl. No. 13/987,074.
U.S. Appl. No. 13/998,065.
U.S. Appl. No. 13/986,744.
U.S. Appl. No. 13/986,251.

* cited by examiner

CONTACT RECOMMENDATIONS BASED ON PURCHASE HISTORY

CLAIM OF PRIORITY

This application claims the benefit of U.S. Provisional Patent Application No. 61/969,447 entitled, SYSTEM AND METHOD FOR CONTACT RECOMMENDATIONS VIA PURCHASE HISTORY, by Jagota, et al., filed Mar. 24, 2014, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database system may use market basket analysis to create association rules in the form of X→Y, where X and Y are disjoint sets of items. Such association rules may be used for making recommendations based on a sufficiently high confidence $P(Y|X)$, which has the interpretation "the probability of Y given X i.e., of the transactions in which at least all of the items in X were purchased, in $P(Y|X)$ of them all the items in Y were also purchased." A high confidence association rule may be used to recommend Y when a user purchases X in the same ecommerce basket or shopping cart. However, even when a database system has basket data available, some basket sizes may be much larger than basket sizes used in typical ecommerce settings. For example, a user may purchase the information for several thousand business contacts in a single transaction, in contrast to typical ecommerce shopping baskets which usually contain less than 30 items. Working with very large basket sizes substantially increases the computational complexity of market basket analysis. Even a fast algorithm slows down immensely on large baskets because even if the database system seeks association rules X→Y in which |X| is small, such as n=3, a basket of size m has "m choose n" subsets of cardinality n each, each of which necessarily has to be enumerated.

BRIEF SUMMARY

In accordance with embodiments, there are provided systems and methods for contact recommendations based on purchase history. A directed graph of nodes is created in which at least some of the nodes are connected by directed arcs, wherein a directed arc from a first node to a second node represents a conditional probability that previous users who purchased a first contact also purchased a second contact. A set of contacts purchased by a current user is identified. A prospective purchase probability is estimated based on a historical probability that previous users purchased a specific contact and a related probability that previous users who purchased the specific contact also purchased a contact in the set of contacts, for each candidate contact. A recommendation for the current user to purchase a recommended candidate contact is output based on a corresponding prospective purchase probability.

For example, a database system creates a directed graph of nodes in which some of the nodes are connected by directed arcs which represent corresponding probabilities that previous users who purchased contacts represented by nodes where directed arcs begin also purchased other contacts represented by nodes where directed arcs end. The database system identifies a set of contacts {A and B} purchased by a current user. The database system estimates a prospective purchase probability based on a historical probability that previous users purchased a specific contact, such as 1% of previous users purchased contact X, and a related probability that previous users who purchased the specific contact also purchased a contact in the set of contacts, such as 10% of previous users who purchased contact X also purchased contact A, for each candidate contact. The database system outputs a recommendation for the current user to purchase recommended candidate contact A based on the corresponding prospective purchase probabilities for the candidate contact A.

While one or more implementations and techniques are described with reference to an embodiment in which contact recommendations based on purchase history is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for contact recommendations based on purchase history. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, mechanisms and methods for contact recommendations based on purchase history will be described with reference to example embodiments. The following detailed description will first describe a method for contact recommendations based on purchase history. Next, a block diagram of an extremely simplified directed graph for contact recommendations based on purchase history is described.

Figure 1:
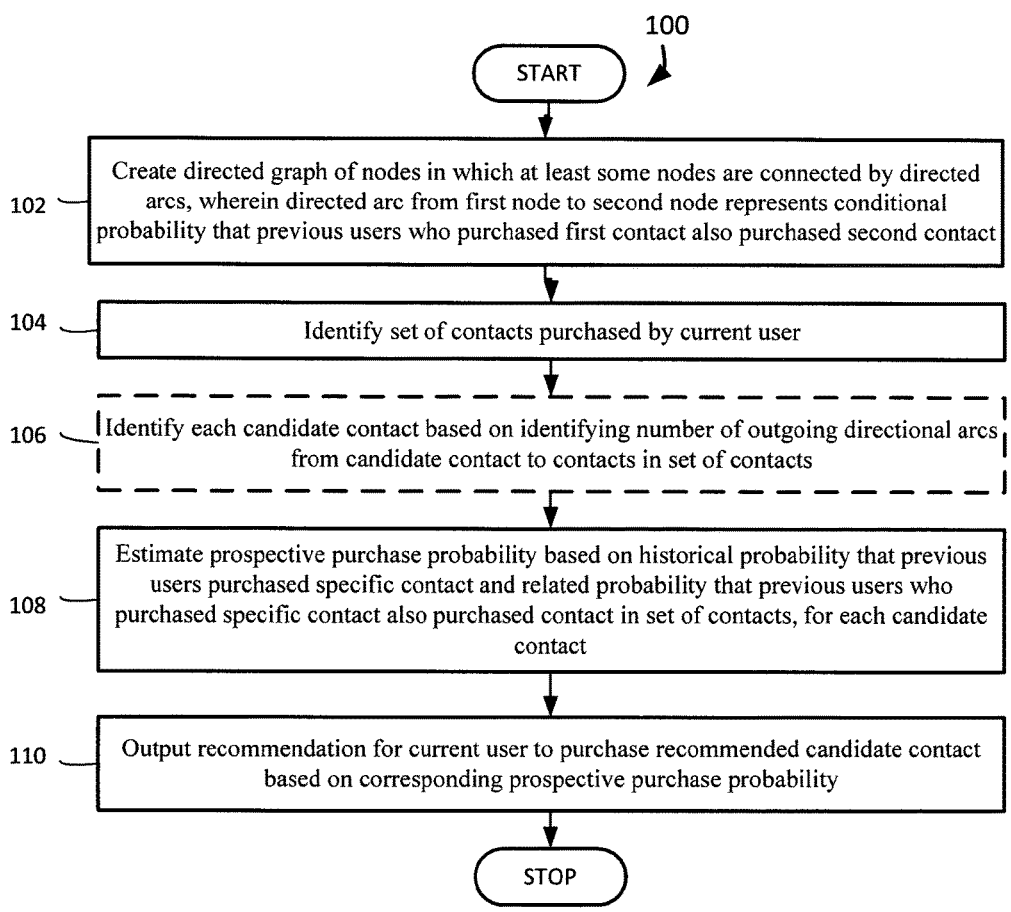
FIG. 1 is an operational flow diagram illustrating a high level overview of a method for contact recommendations based on purchase history, in an embodiment.

FIG. 1 is an operational flow diagram illustrating a high level overview of a method 100 for contact recommendations based on purchase history. As shown in FIG. 1, a database system may recommend contacts based on purchase history.

Figure 2:
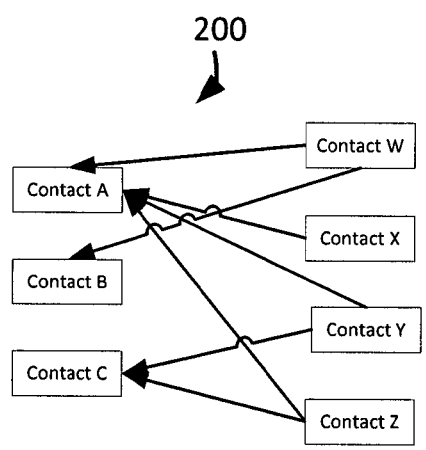
FIG. 2 is a block diagram of an extremely simplified directed graph for contact recommendations based on purchase history, in an embodiment.

A database system creates a directed graph of nodes in which at least some of the nodes are connected by directed arcs, wherein a directed arc from a first node to a second node represents a conditional probability that previous users who purchased a first contact also purchased a second contact, block 102. For example and without limitation, this can include the database system creating a directed graph of nodes in which some of the nodes are connected by arcs which represent corresponding probabilities that previous users who purchased contacts represented by nodes where directed arcs begin also purchased other contacts represented by nodes where directed arcs end. An extremely simplified example of a directed graph is depicted in FIG. 2 and described below in the description of FIG. 2. The number of outgoing directed arcs from a node may be limited to a maximum number of outgoing directed arcs based on a corresponding conditional probability associated with each potential outgoing directed arc. For example, generating directed arcs between millions of nodes in a directed graph may be time-consuming and inefficient, such that the database system may cap the number of outgoing directed arcs to some constant, such as 20, which limits the number of outgoing directed arcs from each node to those directed arcs with the highest probabilities of purchasing another contact. Having created the directed graph, the database system identifies a set of contacts purchased by a current user, block 104. By way of example and without limitation, this can include the database system identifying a set of contacts {A, B, and C} purchased by a current user. An extremely simplified example of a directed graph which includes the set of contacts {A, B, and C} is depicted in FIG. 2 and referenced below in the description of FIG. 2. After identifying a current user's purchase of a set of contacts, the database system optionally identifies each candidate contact based on identifying a number of outgoing directed arcs from a candidate contact to a contact in the set of contacts, block 106. In embodiments, this can include the database system identifying candidate contacts {W, X, Y, and Z} based on identifying at least one outgoing directed arc from each of the candidate contacts {W, X, Y, and Z} to the contacts in the set of contacts {A, B, and C}. An extremely simplified example of a directed graph which includes the candidate contacts {W, X, Y, and Z} is depicted in FIG. 2 and referenced in the description of FIG. 2. An algorithm for identifying candidate contacts is provided below following the description of FIG. 2.

After identifying candidate contacts, the database system estimates a prospective purchase probability based on a historical probability that previous users purchased a specific contact and a related probability that previous users who purchased the specific contact also purchased a contact in the set of contacts, for each candidate contact, block 108. For example and without limitation, this can include the database system estimating a prospective purchase probability based on a historical probability that previous users purchased a specific contact, such as 1% of previous users purchased contact X, and a related probability that previous users who purchased the specific contact also purchased a contact in the set of contacts, such as 10% of previous users who purchased contact X also purchased contact A, for each candidate contact. Although the database system attempts to estimate the likelihood that the current user who purchased the set of contacts {A, B, and C} will also purchase the candidate contact X, the database system does not attempt to directly calculate the probability P(X|{A, B, and C}). To be able to directly calculate the probability P(X|{A, B, and C}) whenever needed for any user having purchased the set of contacts {A, B, and C}, the database system would have to compute P(X|{A, B, and C}) for every quadruplet {A, B, C, X}. The data storage could be restricted to the highest scoring X's, such as the top 20 X's, for any given set of contacts {A, B, C}. Even then, the number of triplets {A, B, C} could be extremely large. If data storage stores 1 million contacts, then the number of triplets of these 1 million contacts is of the order 1 million raised to the power of 3, or one quintillion.

Therefore, the database system bases estimates on the related probabilities for the candidate contacts associated with the relatively few incoming directed arcs to contacts in the purchased set of contacts. The incoming directed arcs provide related probabilities that previous users who purchased a specific candidate contact also purchased a contact in the set of contacts purchased by the current user. Using the current example, instead of estimating P(X|{A, B, and C}), the probability of purchasing candidate contact X given that the set of contacts {A, B, and C} is already purchased, the database system estimates P({A, B, and C}|X), the probability of purchasing the set of contacts {A, B, and C} given that the candidate contact X is purchased. In this example, the database system estimates the probability that the current owner who purchased the set of contacts {A.B. and C} also purchases the candidate contact X based on the equation P(X|{A, B, and C})=P(X)*P(A|X), *P(B|X), *P(C|X)/P({A, B, and C}). This equation is read as the probability that X is purchased given that the set {A, B, and C} is purchased is proportional to the probability that X is purchased multiplied by the probability that A is purchased given that X is purchased multiplied by the probability that B is purchased given that X is purchased multiplied by the probability that C is purchased given that X is purchased. Since the directed graph likely does not have all possible arcs (otherwise it might be too large), an arc from X to A, B, and/or C might be absent. In this situation, the database system completes the equation by substituting the probability that a contact in the set of contacts is purchased for the probability that the contact is purchased given that the candidate contact is purchased. In the current example, the database system would substitute P(B) for P(B|X) in the equation described above. The mathematical basis for such equations is provided in detail below following the description of the method 100.

The counter-intuitive use of incoming directed arcs easily enables the database system to estimate the probability that a user who purchased a set of contacts will also purchase a candidate contact. The incoming directed arcs to the contacts in the purchased set of contacts already exist, the number of directed arcs may already be limited to a reasonable number for each candidate contact, such as 20, and the vast number of candidate contacts in a typical contact database enables the database system to recommend a significant number of candidate contacts. Furthermore, the incoming directed arcs to the contacts in the purchased set of contacts already identifies significant associations that already exist between contacts in the purchased set of contacts and candidate contacts, associations which the database system may use to estimate prospective purchase probabilities.

The database system uses the historical probability that previous users purchased a specific contact to estimate a prospective purchase probability for each specific contact, thereby taking into account the general purchase popularity for each specific contact by all previous users. The historical probability that previous users purchased each specific contact may be adjusted for purchase recency. For example, a previous user recently purchasing a contact in the purchased set of contacts and shortly thereafter purchasing a candidate contact results in a higher historical probability than the historical probability based on a previous user purchasing a contact in the purchased set of contact many years ago followed years later by purchasing the candidate contact. Details of using purchase recency to calculate historical probability are provided below following the description of FIG. 2.

After estimating a prospective purchase probability for each candidate contact, the database system outputs a recommendation for the current user to purchase a recommended candidate contact based on a corresponding prospective purchase probability, block 110. By way of example and without limitation, this can include the database system outputting a recommendation for the current user to purchase the recommended candidate contacts {W, Y, and Z} based on the corresponding prospective purchase probabilities for the candidate contacts {W, Y, and Z}. An algorithm for recommending candidate contacts, as applied to the candidate contacts {W, X, Y, and Z}, is provided below following the description of FIG. 2.

The method 100 may be repeated as desired. Although this disclosure describes the blocks 102-110 executing in a particular order, the blocks 102-110 may be executed in a different order. In other implementations, each of the blocks 102-110 may also be executed in combination with other blocks and/or some blocks may be divided into a different set of blocks.

A database system may estimate the probability $P(j|C)$ that a user who has purchased all of the contacts in a given set C will also purchase the candidate contact j, which is not in the set C, in order to recommend to the user to purchase the candidate contact j. The database system may identify candidate contacts j not in the set C that have high a $P(j|C)$. Since every contact may have its own page of information, the database system may add pointers to the contacts j for which $P(j|i)$ is sufficiently high on the page for each contact i.

Purchase data may be available in one of two forms, basket data and non-basket purchased data. Basket data is a set of (u,C,t) triples denoting "the user u purchased the set of contacts C at the time t," in which each triple is a transaction. Non-basket purchased data is a set of (u,c,t) triples denoting "the user u purchased the single contact c at the time t," which has no transaction information which indicates which other contacts were purchased by the user u along with the single contact c at the time t. That is, if a transaction was in the form (u,C,t), then the database system created |C| triples in the form (u,c,t) for all of the contacts c in the set C. The database system's first approach below may be seen as an approximation to market basket analysis which captures high confidence association rules X→Y in which |X|=|Y|=1 in a directed graph, and uses Bayesian inference under a conditional independence assumption to estimate $P(j|C)$ when |C|>1. The first model is for the case $P(j|i)$, which covers the case of |C| approximately, as described below. The model is a directed graph, whose nodes are contacts. There is a directed arc from the node i to the node j with the associated weight $P(j|i)$. Each node i in the directed graph also has an associated probability $P(i)$. $P(i)$ is the probability of the contact i being purchased. In a practical realization with a directed graph that has millions of nodes, the database system may keep the directed graph sparse. Specifically, for any given contact i, the database system may cap the number of outgoing directed arcs to some constant, such as 20, of the directed arcs with the highest values of $P(j|i)$.) For the database system to estimate $P(j|C)$, when |C|>1, by Bayes rule:

$$P(j|C)=P(C|j)*P(j)/P(C) \qquad \text{[equation 1]}$$

By assuming conditional independence of the elements of the set C given the contact j, and by observing that P(C) does not depend on j, the database system may use the following equation 2:

$$P(j)*\text{product}\_\{c \text{ in } C\}P(c|j) \qquad \text{[equation 2]}$$

The equation 2 is monotone in $P(j|C)$, can be used to rank the candidate contacts j instead of $P(j|C)$, and is computable from the node and edge (arc) weights of the directed graph. A complete directed graph has $P(c|j)$ for every contact c and contact j. In practice, a directed graph is highly unlikely to be complete because that would require too much storage. Therefore, a node may only have a small number of out-neighbors, the highest scoring neighbors. So in the equation 2, it is possible that the directed graph does not have a directed arc from the contact j to the contact c for some pairs (c, j). In such cases, the database system approximates $P(c|j)$ by $P(c)$.

For a given C, where |C|>1, the database system finds the set S(C) of candidates to score for recommendation as follows. Let I(v) denote the set of in-neighbors of vertex v. The set of candidates is:

$$S(C)=\cup I(c)-C \text{ for } c \in C \qquad \text{[equation 3]}$$

The database system scores each candidate contact j in the set S(C) against the set C, and ranks each candidate contact accordingly. The database system may use an optimization that is sometimes more efficient when the set C is large. For $j \in S(C)$, the database system defines:

$$d(j,C)=|O(j) \cap C| \quad \text{[equation 4]}$$

d(j,C) is the number of out-neighbors of the contact j that are in the set C. Generally, the higher d(j,C) is, the higher the score defined by the equation 2 will be. In view of this, it makes sense for the database system to find only that subset of S(C) in which, for every $j \in S(C)$, d(j,C) is sufficiently high. The equation 5 below is a more efficient variant of the equation 4 for this purpose.

$$S(C) = \cup I(c1) \cap I(c2) - C \text{ for } c1, c2 \in C \quad \text{[equation 5]}$$

When the database system executes the equation 5, the database system only finds those j for which d(j,C)≥2, which is depicted in FIG. 2 and described below.

FIG. 2 illustrates a block diagram of an extremely simplified example of a directed graph 200 for contact recommendations based on purchase history, under an embodiment. In FIG. 2, C={A, B, and C}. When the database system executes the equation 5, the database system finds S(C)={W, Y, and Z}. The algorithm can be further optimized to the following:

```
S(C) = { } // empty set
for k = |C| down to 1
    for each k-element subset Ck of C
        S(C) = S(C) ∪ (∩ I(i)) for i∈Ck
    end
end
S(C) = S(C) - C
```

Furthermore, when the database system adds an element to the set S(C) in this algorithm, the database system also adds the element to an auxiliary data structure, a hash whose keys are values of k. The value associated with a key is the set of candidate contacts j in the set S(C) whose d(j,C) equals k. This data structure, and updates to it, are not described above, but are illustrated in the table 1 below, under the column titled H.

TABLE 1

Illustration of the above algorithm on the directed graph of FIG. 2.

| K | Ck | ∩ I(i) i∈Ck | S(C) | H |
|---|---|---|---|---|
| 3 | {A, B, C} | empty set | empty set | empty hash |
| 2 | {A, B} | {W} | {W} | {2 → {W}} |
| 2 | {B, C} | empty set | | |
| 2 | {A, C} | {Y, Z} | {W, Y, Z} | {2 → {W, Y, Z}} |
| 1 | {A} | {W, X, Y, Z} | {W, X, Y, Z} | {2 → {W, Y, Z}, 1 → {X}} |
| 1 | {B} | {W} | | |
| 1 | {C} | {Y, Z} | | |

The algorithm's final output of interest is the last value of column H. In the table 1 case, this would be {2→{W,Y,Z}, 1→{X}}. This output suggests that the database system wants to score W, Y, and Z first, each against C={A,B,C}, and X last, as appropriate, because each of the candidate contacts {W, Y, and Z} have 2 outgoing directed arcs to contacts in the set of contacts {A, B, and C}, while the candidate contact X has only 1 outgoing directed arc to the set of contacts {A, B, and C}. In practice, a streaming implementation of this algorithm could be easily made to produce key-value pairs in the order: 2→{W,Y,Z}1→{X}. The database system could then process (score) the elements in the key-value pairs in the order presented, and stop if too much time has been spent, thereby giving priority to candidate contacts with more outgoing directed arcs to the contacts in the current user-purchase set of contacts.

Using non-basket purchased data, a sensible and easy estimate of P(j|i) is the fraction of those users who purchased the contact i who also purchased the contact j. The obvious estimate of P(i) is the fraction of all purchases, i.e. of triples (u, c, t), in which the contact c is the value i. Arguably, recent purchases are more significant than older purchases. Therefore, the database system may use a recency-weighted version of the estimates. First, the database system transforms the time t in a triple (u, c, t) to a recency-weight wt=exp(−(now−t).days/Q). Here Q is a suitably chosen positive constant that controls the exponential decay rate. Q=715.0 has been found to be a good choice. The alias wuc≡wt is used for notational convenience below. This assumes that the pair (u, c) does not occur in more than one triple, which is a reasonable assumption. The recency-weighted estimate equations are below. R(i) is the estimate of P(i); R(j|i) is the estimate of P(j|i), and u~c denotes that the user u purchased the contact c.

$$R(i) = \Sigma wui \text{ for } u:u\sim i/\Sigma wuc \text{ for } u,c:u\sim c \quad \text{[equation 6]}$$

$$R(j|i) = \Sigma \sqrt{wuiwuj} \text{ for } u:u\sim i \text{ \& } u\sim j/\Sigma wui \text{ for } u:u\sim i \quad \text{[equation 7]}$$

The R(i) formula in the equation 6 needs no explanation because it is transparent. The R(j|i) formula in the equation 7 requires some explanation. The numerator in R(j|i) sums over all unordered pairs {i, j} of the contacts purchased by the user u. The contact i may be purchased by the user u at a different time than the contact j was purchased by the user u. That is, wui and wuj may have different values. The database system may aggregate these values into a single sensible number by taking their geometric mean. One interesting characteristic that R(j|i) exhibits is presented in the following extreme example: n users have purchased the contact i, all 5 years ago, and the same n users purchased the contact j today. Therefore, R(j|i) equals n, which may seem strange. However, this result is not unreasonable because if the same n users who purchased the contact i five years back also purchased the contact j today, then the strength of the association i→j should indeed be very high.

In the previous section, the estimates of P(j|i) and P(i) were defined from non-basket purchased data. In practice, such data from which to construct these estimates is often large. For example, some databases may have about 300 million triples (u, c, t) on about 40 million contacts, such that there are about 40 million distinct values of c. Therefore, a corresponding constructed graph may have roughly 40 million nodes. Viewed naively, all ordered pairs of nodes have to be considered for directed arc placement and associated directed arc weight calculation. For any given ordered pair (i, j) of nodes, the estimate of P(j|i) involves computing the fraction of users who purchased the contact i who also purchased the contact j. Therefore, the naive way of building this directed graph is un-scalable in practice. The challenges of building this directed graph may be formulated in a map reduce paradigm, and use a software framework for storage and large-scale processing of data sets, such as Hadoop®, for its solution. The solution uses two map-reduce phases. The first map-reduce phase groups the input set {(u, c, t)} of triples by the user u, with the tuples for any fixed user sorted in order of non-increasing time. This results in a set of u→<c1, . . . , ck> pairs, where u is a user and <c1, . . . , ck> is the list of contacts that the user u has purchased, in order of non-increasing time. This ordering is done because for some users, the value k is in the millions. Processing this list for the purposes of computing the directed graph is extremely slow, even in a Hadoop® setting. By maintaining such lists in time sorted order, truncating very large lists favors recent purchases over older ones a sensible heuristic. The second map-reduce phase inputs the output of the reduce 1 phase, such as key-value pairs of the form u→<c1, ..., ck>. The map 2 phase transforms such a pair to the pairs:

$$c1 \to <c1,\ldots,ck>, c2 \to <c1,\ldots,ck>,\ldots, ck \to <c1,\ldots,ck> \quad \text{[equation 8]}$$

Think of $ci \to <c1, \ldots, ck>$ as capturing one co-occurrence of ci with each of c1, c2, ..., ck. The reduce 2 phase processes the pairs produced by the map 2 phase, after they have been grouped by contacts. Table 4 below provides an example. The reduce 2 phase outputs key-value pairs of the form:

$$ci \to <n, cj1, p(cj1|ci), cj2, p(cj2|ci), \ldots, cjk, p(cjk|ci)> \quad \text{[equation 9]}$$

Here n is the number of purchases of contact ci, <cj1, ..., cjk> is a list of contacts deemed similar to contact ci sorted in non-increasing order of their probabilities p(cj|ci). In a simple example, Table 2 below shows the input to the map 1 phase.

TABLE 2

Example input to the map 1 phase, in which time is shown in whole numbers, and time unit 1 is before time unit 2.

| User | Contact | Time |
|---|---|---|
| u1 | c3 | 1 |
| u1 | c1 | 2 |
| u1 | c2 | 3 |
| u2 | c4 | 2 |
| u2 | c1 | 4 |

Table 3 below shows the output of the reduce 1 phase for this input to the map 1 phase, and indicates that the user u1 purchased the contact c2 most recently, the contact c1 before then, and the contact c3 the earliest.

TABLE 3

Output of the reduce 1 phase.

| User | Contact List |
|---|---|
| u1 | <c2, c1, c3> |
| u2 | <c1, c4> |

Table 4 below shows the output of the map 2 phase.

TABLE 4

Output of the map 2 phase.

| Key | Value |
|---|---|
| c2 | <c2, c1, c3> |
| c1 | <c2, c1, c3> |
| c3 | <c2, c1, c3> |
| c1 | <c1, c4> |
| c4 | <c1, c4> |

Table 5 below shows the output of the reduce 2 phase. The key is dropped from each value when present.

TABLE 5

Output of the reduce 2 phase.

| Key | Value |
|---|---|
| c1 | <2, c2, 0.5, c3, 0.5, c4, 0.5> |
| c2 | <1, c1, 1, c3, 1> |
| c3 | <1, c1, 1, c2, 1> |
| c4 | <1, c1, 1> |

The first row of the table 5 is read as "2 users purchased the contact c1, a probability of 0.50 of these users (one user) also purchased the contact c2, a probability of 0.50 of these users (one user) also purchased the contact c3, and a probability of 0.50 of these users (one user) also purchased the contact c4."

The probabilistic version ranks candidate contacts j to recommend for a given set C of contacts by P(j|C). A compelling alternative is the so-called lift, defined as P(j|C)/P(j). Lift is much larger than 1.0 when P(j|C) is much larger than P(j). In view of this, lift based ranking can favor discoverability over popularity. The decision of whether to rank by confidence or by lift can be made dynamically since the directed graph stores the statistics to compute both confidence and lift. In view of this, A-B runtime testing of these two choices is convenient.

A company of a contact is known generally for most databases of contacts. Consider the data set of type 2, a set of (u, c, t) triples where c denotes a contact. The database system may replace c in each triple by the company cm of c, and generate a directed graph based on this new data, exactly as before. This directed graph's nodes are companies, P(i) is the fraction of all contact purchases triples (u, cm, t) that have been of contacts at company i, and P(j|i) is the fraction of users who purchased contacts in company i who also purchased contacts in company j. This directed graph may be used to recommend companies. The database system may provide recommendations to users who are purchasing contacts at a certain company i to consider purchasing recommended companies j for which P(j|i) is sufficiently large. Ranking by the lift based alternative may be compelling here because discoverability of nonobvious relationships between companies is especially valued.

System Overview

Figure 3:
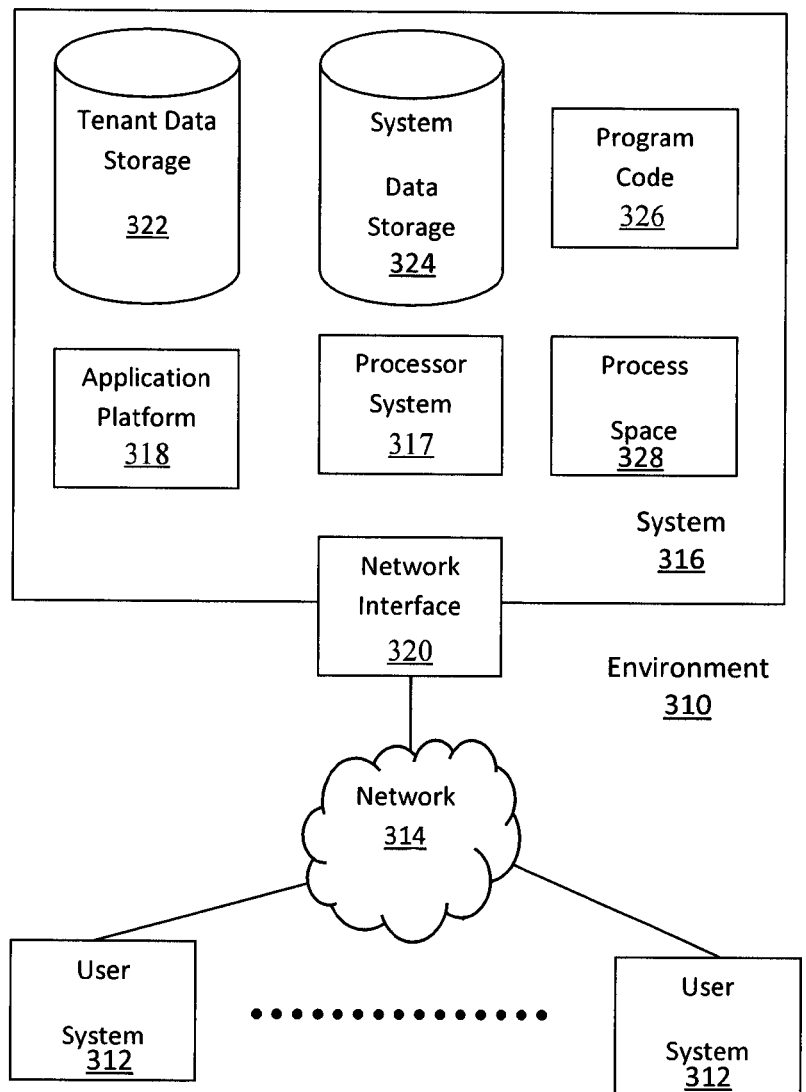
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 4:
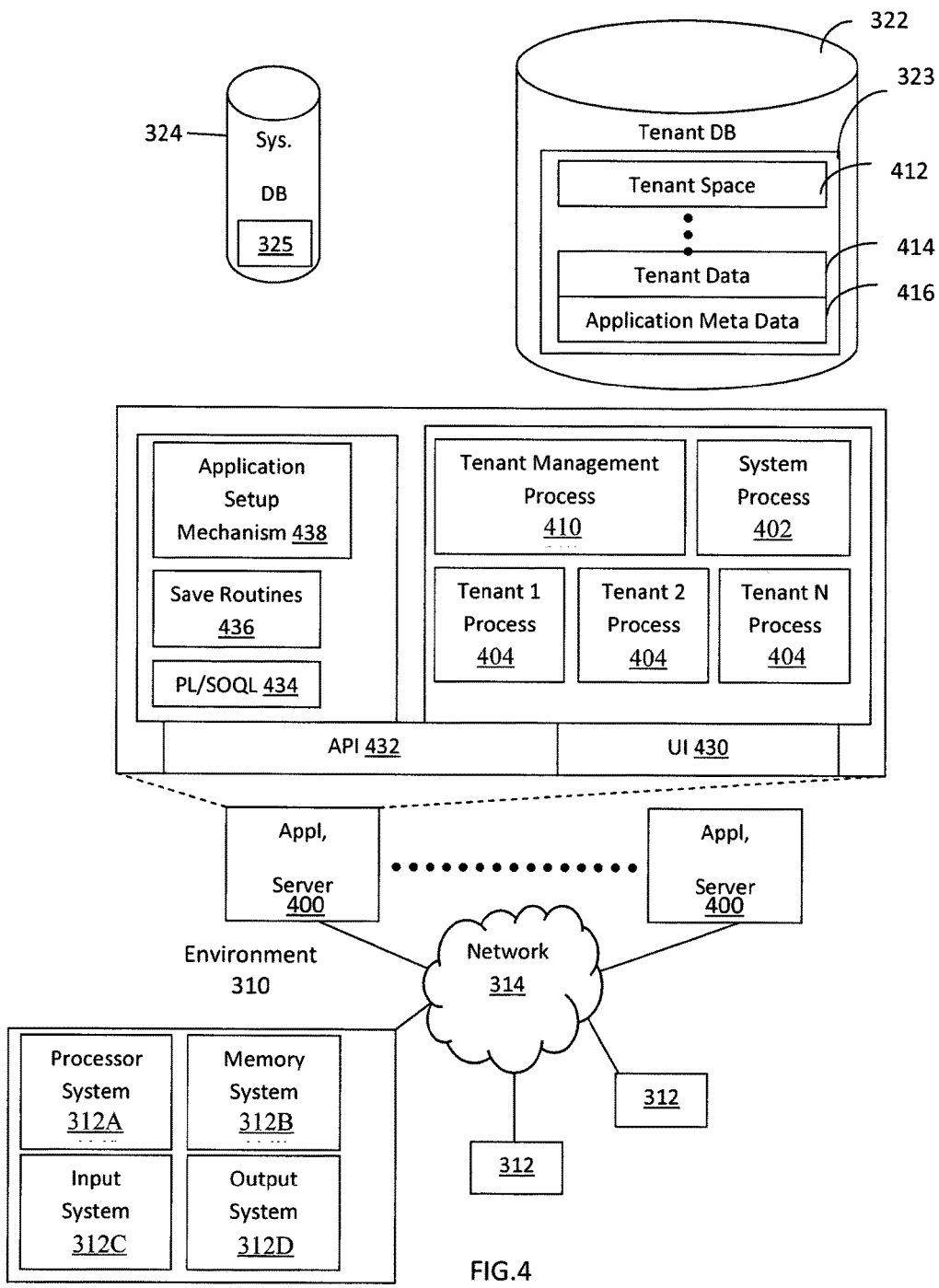
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers $400_1$-$400_N$, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which can be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 34 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server 400₁ might be coupled via the network 314 (e.g., the Internet), another application server 400_{N-1} might be coupled via a direct network link, and another application server 400_N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for contact recommendations based on purchase history, the system comprising:
   one or more processors of a computer communicatively coupled to a contact database system; and
   a non-transitory computer readable medium storing a plurality of instructions, which when executed by the computer, cause the one or more processors to:
     receive a request to purchase a plurality of contacts from the contact database by a current user, the request being received over a network;
     create a directed graph, based on a stored plurality of historical purchase data within the contact database, of a plurality of nodes in which at least some of the plurality of nodes are connected by a plurality of directed arcs, wherein a directed arc from a first node to a second node represents a conditional probability that previous users who purchased a first contact also purchased a second contact within the stored historical purchase data, a number of outgoing directed arcs from the first node being limited to a maximum number of outgoing directed arcs, each of the maximum number of outgoing directed arcs representing a corresponding conditional probability that is greater than each non-zero conditional probability corresponding to each potential outgoing directed arc;
     determine a set of candidate contacts, each candidate contact in the set of candidate contacts being connected to one of the requested plurality of contacts by a direct arc;
     estimate a prospective purchase probability for each of the candidate contacts in the set of candidate contacts connected by the plurality of directed arcs based on a historical probability that previous users purchased a specific contact of the candidate contacts and a related probability that previous users who purchased the specific contact also purchased a contact in the requested plurality of contacts, the historical probability and the related probability being derived from the historical purchase data, the previous users being different than the current user;
     output a recommendation for the current user to purchase a recommended candidate contact from the set of candidate contacts based on a corresponding prospective purchase probability associated with the recommended candidate contact; and
     transmit the recommendation over the network to the current user.

2. The system of claim 1, wherein estimating the prospective purchase probability is further based on another related probability that previous users who purchased the specific contact also purchased another contact in the set of contacts, for each candidate contact.

3. The system of claim 1, wherein the historical probability that previous users purchased the specific contact is adjusted for purchase recency.

4. The system of claim 1, comprising further instructions, which when executed, cause the one or more processors to identify each candidate contact based on identifying a number of outgoing directed arcs from a candidate contact to contacts in the set of contacts.

5. A computer program product comprising computer-readable program code to be executed by one or more processors when retrieved from a non-transitory computer-readable medium, the program code including instructions to:
   receive a request to purchase a plurality of contacts from a contact database system by a current user, the request being received over a network;
   create a directed graph, based on a stored plurality of historical purchase data within the contact database, of a plurality of nodes in which at least some of the plurality of nodes are connected by a plurality of directed arcs, wherein a directed arc from a first node to a second node represents a conditional probability that previous users who purchased a first contact also purchased a second contact within the stored historical purchase data, wherein a number of outgoing directed arcs from the first node is limited to a maximum number of outgoing directed arcs, each of the maximum number of outgoing directed arcs representing a corresponding conditional probability that is greater than each non-zero conditional probability corresponding to each potential outgoing directed arc;
   determine a set of candidate contacts, each candidate contact in the set of candidate contacts being connected to one of the requested plurality of contacts by a direct arc;
   estimate a prospective purchase probability for each of the candidate contacts in the set of candidate contacts connected by the plurality of directed arcs based on a historical probability that previous users purchased a specific contact of the candidate contacts and a related probability that previous users who purchased the specific contact also purchased a contact in the requested plurality of contacts, the historical probability and the related probability being derived from the historical purchase data, the previous users being different than the current user;
   output a recommendation for the current user to purchase a recommended candidate contact from the set of candidate contacts based on a corresponding prospective purchase probability associated with the recommended candidate contact; and
   transmit the recommendation over the network to the current user.

6. The computer program product of claim 5, wherein estimating the prospective purchase probability is further based on another related probability that previous users who purchased the specific contact also purchased another contact in the set of contacts, for each candidate contact.

7. The computer program product of claim 5, wherein the historical probability that previous users purchased the specific contact is adjusted for purchase recency.

8. The computer program product of claim 5, wherein the program code comprises further instructions to identify each candidate contact based on identifying a number of outgoing directed arcs from a candidate contact to contacts in the set of contacts.

9. A method for contact recommendations based on purchase history, the method comprising:
   receiving a request to purchase a plurality of contacts from a contact database system by a current user, the request being received over a network;
   creating, based on a stored plurality of historical purchase data within the contact database, a directed graph of a plurality of nodes in which at least some of the plurality of nodes are connected by a plurality of directed arcs, wherein a directed arc from a first node to a second node represents a conditional probability that previous users who purchased a first contact also purchased a second contact within the stored historical purchase data, a number of outgoing directed arcs from the first node being limited to a maximum number of outgoing directed arcs, each of the maximum number of outgoing directed arcs representing a corresponding conditional probability that is greater than each non-zero conditional probability corresponding to each potential outgoing directed arc;
   determine a set of candidate contacts, each candidate contact in the set of candidate contacts being connected to one of the requested plurality of contacts by a direct arc;
   estimating a prospective purchase probability for each of the candidate contacts in the set of candidate contacts connected by the plurality of directed arcs based on a historical probability that previous users purchased a specific contact of the candidate contacts and a related probability that previous users who purchased the specific contact also purchased a contact in the requested plurality of contacts, the historical probability and the related probability being derived from the historical purchase data, the previous users being different than the current user;
   outputting a recommendation for the current user to purchase a recommended candidate contact from the set of candidate contacts based on a corresponding prospective purchase probability associated with the recommended candidate contact; and
   transmitting the recommendation over the network to the current user.

10. The method of claim 9, wherein estimating the prospective purchase probability is further based on another related probability that previous users who purchased the specific contact also purchased another contact in the set of contacts, for each candidate contact.

11. The method of claim 9, wherein the historical probability that previous users purchased the specific contact is adjusted for purchase recency.

12. The method of claim 9, the method further comprising identifying each candidate contact based on identifying a number of outgoing directed arcs from a candidate contact to contacts in the set of contacts.

13. A system comprising:
   a processor-based application, which when executed on a computer communicatively coupled to a contact database, will cause the processor to:
   receive a request to purchase a plurality of contacts from the contact database system by a current user, the request being received over a network;
   create a directed graph, based on a stored plurality of historical purchase data within the contact database, of a plurality of nodes in which at least some of the plurality of nodes are connected by a plurality of directed arcs, wherein a directed arc from a first node to a second node represents a conditional probability that previous users who purchased a first contact also purchased a second contact within the stored historical purchase data, a number of outgoing directed arcs from the first node being limited to a maximum number of outgoing directed arcs, each of the maximum number of outgoing directed arcs representing a corresponding conditional probability that is greater than each non-zero conditional probability corresponding to each potential outgoing directed arc;
   determine a set of candidate contacts, each candidate contact in the set of candidate contacts being connected to one of the requested plurality of contacts by a direct arc;
   estimate a prospective purchase probability for each of the candidate contacts in the set of candidate contacts connected by the plurality of directed arcs based on a historical probability that previous users purchased a specific contact of the candidate contacts and a related probability that previous users who purchased the specific contact also purchased a contact in the requested plurality of contacts, the historical probability and the related probability being derived from the historical purchase data, the previous users being different than the current user;
   output a recommendation for the current user to purchase a recommended candidate contact from the set of candidate contacts based on a corresponding prospective purchase probability associated with the recommended candidate contact; and
   transmit the recommendation over the network to the current user.

14. The system of claim 13, wherein estimating the prospective purchase probability is further based on another related probability that previous users who purchased the specific contact also purchased another contact in the set of contacts, for each candidate contact.

15. The system of claim 13, wherein the historical probability that previous users purchased the specific contact is adjusted for purchase recency.

16. The system of claim 13, the method further comprising transmitting code to identify each candidate contact based on identifying a number of outgoing directed arcs from a candidate contact to contacts in the set of contacts.

* * * * *